United States Patent [19]

Gardner

[11] 4,382,346

[45] May 10, 1983

[54] FISH HOOK SETTING DEVICE

[76] Inventor: Frank N. Gardner, 4624 Wyman Dr., Sacramento, Calif. 95821

[21] Appl. No.: 234,988

[22] Filed: Feb. 17, 1981

[51] Int. Cl.³ ............................................. A01K 91/06
[52] U.S. Cl. ........................................................ 43/15
[58] Field of Search ................................ 43/15, 16, 25

[56] References Cited

U.S. PATENT DOCUMENTS

| 2,552,516 | 5/1951 | Camp | 43/15 |
| 2,590,721 | 3/1952 | Muth | 43/15 |
| 2,746,197 | 5/1956 | Rogers | 43/15 |
| 2,797,516 | 7/1957 | Suddarth | 43/15 |
| 2,850,831 | 9/1958 | Setterdahl | 43/15 |
| 3,078,609 | 2/1963 | Efird | 43/15 |
| 3,200,530 | 8/1965 | Dworski | 43/16 |
| 3,702,512 | 11/1972 | Hodshire | 43/15 |
| 3,852,905 | 12/1974 | Webb | 43/15 |

Primary Examiner—Nicholas P. Godici
Assistant Examiner—M. Jordan

[57] ABSTRACT

Fish hook setting apparatus adapted to be mounted on a fishing pole to grip fishing line and to automatically pull sharply on the line when a fish seizes the hook and thus tugs the line, thereby setting or embedding the fish hook in the mouth of the fish.

5 Claims, 12 Drawing Figures

U.S. Patent May 10, 1983 Sheet 1 of 2 4,382,346
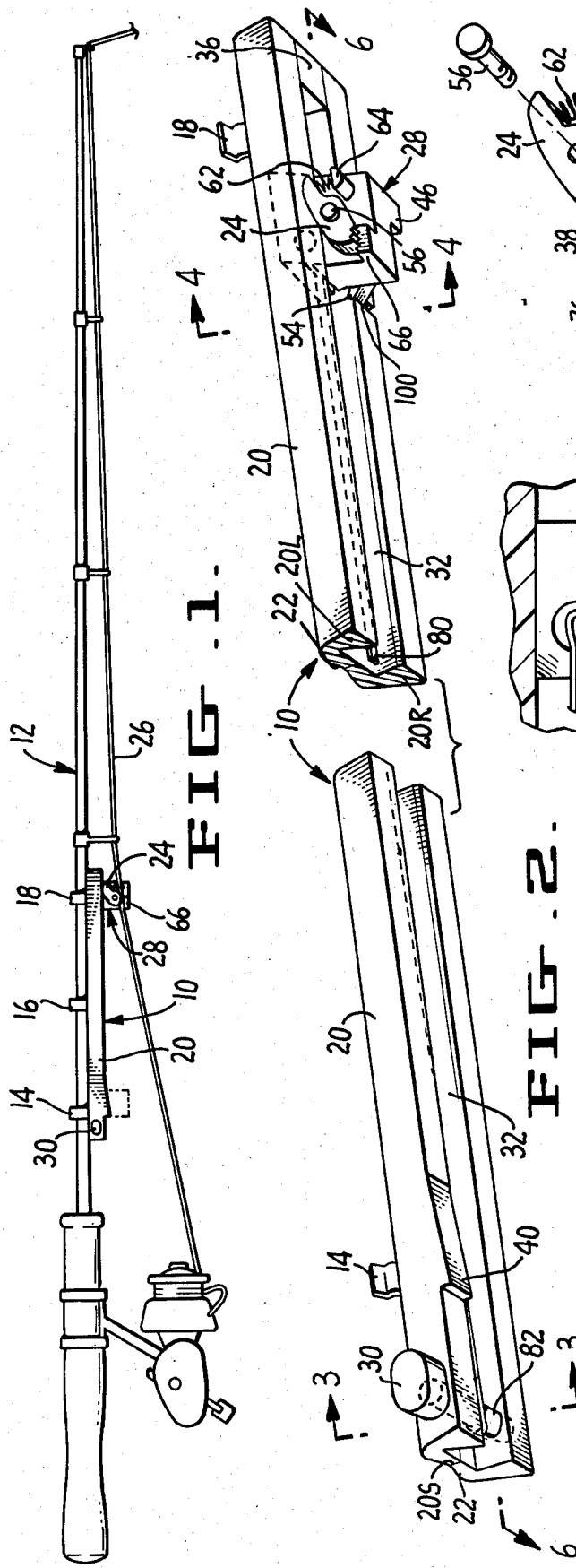
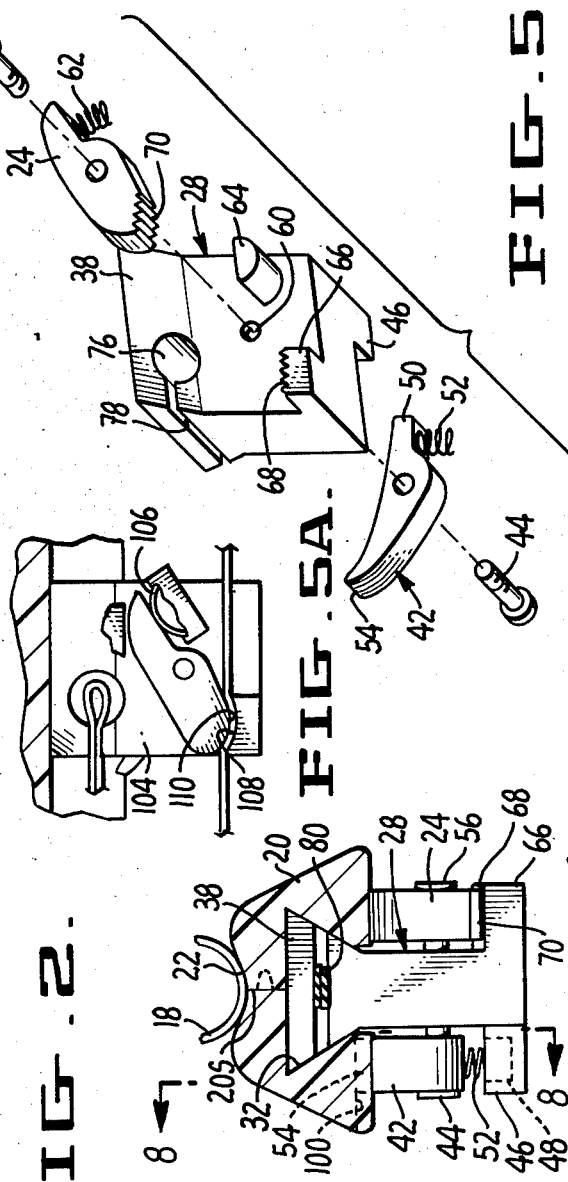
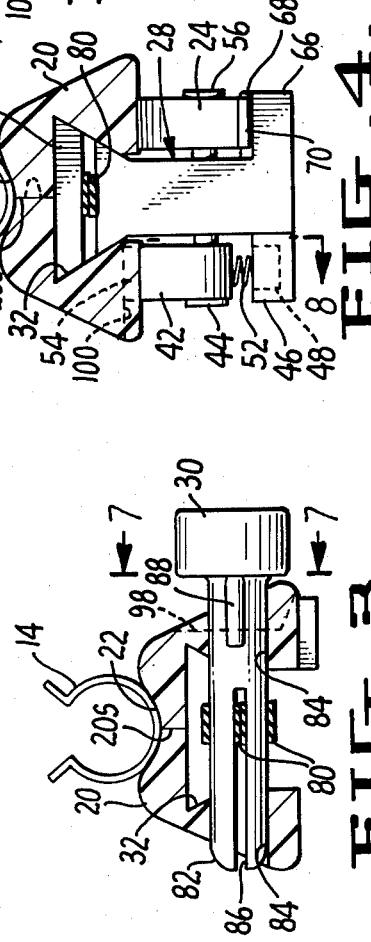

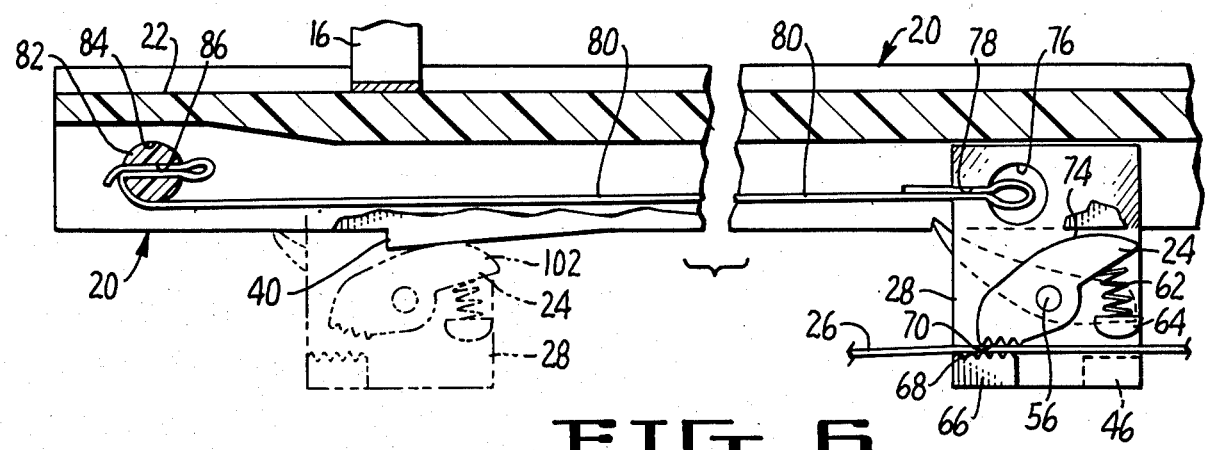
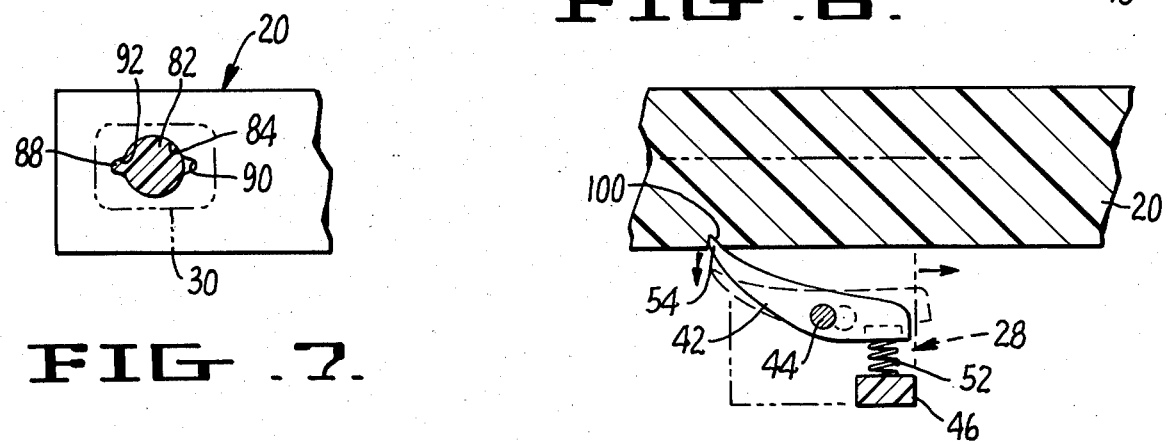
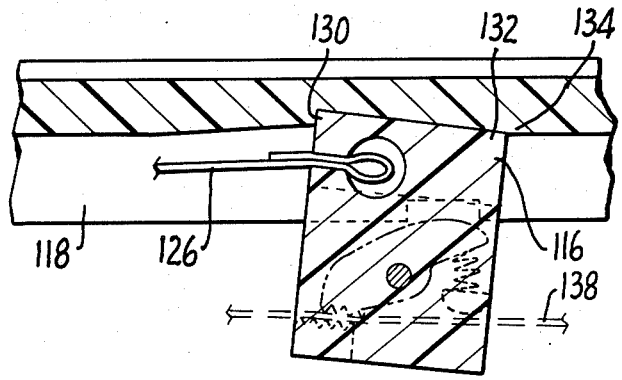
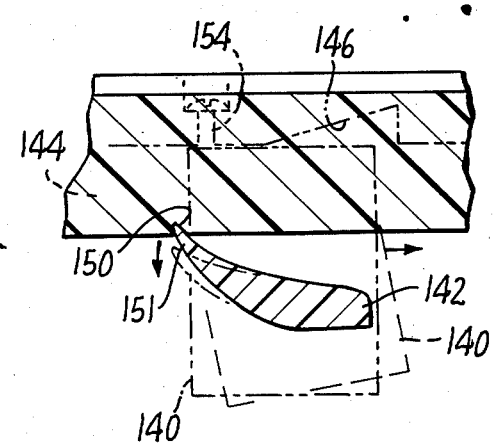
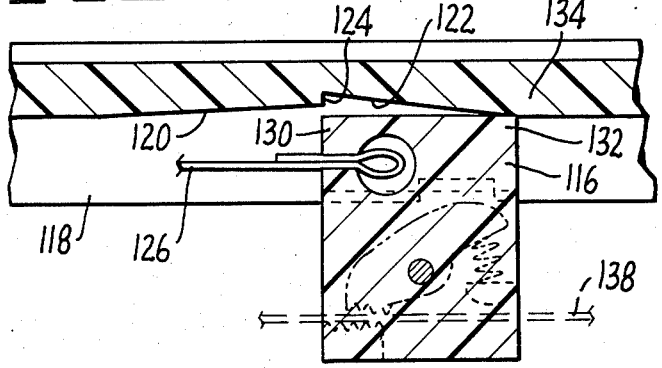

FISH HOOK SETTING DEVICE

BACKGROUND OF THE INVENTION

1. Field of the Invention

My invention relates to fishing equipment, and more particularly to fish hook setting devices for automatically embedding or setting fish hooks in the mouths of fish.

2. Prior Art Statement (The following prior art statement is submitted pursuant to 37 CFR 1.97 and 1.98. The required patent copies are submitted herewith.)

It is well-known to the sport fisherman that ideally he must keep constant surveillance on his fishing line so that when a fish nibbles at the bait he can jerk upwardly on the fishing pole to embed the fish hook in the mouth of the fish. This need for constant surveillance can be inconvenient to the sport fisherman, since it limits the number of fishing lines that he can tend, and limits the amount of distraction that he can tolerate. In some instances, this requirement for constant surveillance can cause physical discomfort to the fisherman, as in ice fishing.

Various devices have been provided for automatically setting fish hooks to relieve the fisherman from said requirement for constant surveillance. In general, these prior art devices have been cumbersome, complex, or difficult to maintain. Some of these devices are expensive to manufacture because, they involve the use of elongated coil springs, which cannot be fabricated from conventional spring materials but rather must be fabricated from corrosion-resistant materials in order to withstand the effects of water and other elements of the typical fishing environment.

One of these prior art devices is disclosed in U.S. Pat. No. 2,590,721, which was issued to Charles H. Muth on Mar. 25, 1952. The elongated coil spring of the device of the Muth patent, indicated by the reference numeral 16, is shown in FIGS. 2, 3, 4, and 5 of the Muth patent.

Another prior art device is disclosed in U.S. Pat. No. 2,746,197, issued to Harlan N. Rogers on May 22, 1956. The coil spring 32 of the fish hook setting device of the Rogers patent is shown in FIGS. 3 and 4 thereof.

Other U.S. patents relating to fish hook setting devices which have come to my attention are: U.S. Pat. Nos. 3,852,905; 3,787,994; 2,850,831; 2,658,299; 2,567,340; 2,578,887; 2,841,912; 3,015,181; 2,899,768; 3,889,413; 2,887,812; 2,913,845; 2,657,493; 2,659,174; 2,906,049; 3,874,106; and 2,640,290. By referring to these other patents by number only, rather than discussing them at greater length and supplying copies thereof as in the case of the Muth and Rogers patents, I do not mean to imply that any of these other patents might not be considered by someone to be more pertinent to my invention than either the Muth patent or the Rogers patent.

SUMMARY OF THE INVENTION

In accordance with a feature of my invention, the fish hook setting device of my invention may either be integral with or demountably attached to the associated fishing pole.

In accordance with another feature of my invention, the fish hook setting device of my invention releaseably grips the fishing line in such manner that when a fish takes the bait and thus tugs on the fishing line the device will be actuated to jerk the line and embed or set the hook in the mouth of the fish.

In accordance with a further feature of my invention, the fish hook setting device of my invention will automatically release the fishing line substantially immediately after it automatically pulls the line to set the hook in the mouth of the fish, thus making it possible for the fisherman to immediately begin to reel in the line.

In accordance with another feature of my invention, the power for setting the fish hook is supplied by an elongated elastic member, rather than a corrodible metallic spring.

In accordance with yet another feature of my invention, said elongated elastic member is so mounted in the device of my invention as to be easily removed and replaced at the fishing site without tools, or with only such simple tools as are commonly found in the tackle boxes of sport fishermen.

In accordance with a further feature of my invention, the fish hook setting devices thereof comprise drum means about which ends of said elastic members can be selectively wound, thereby providing a wide range of hook setting forces.

In accordance with a yet further feature of my invention, said elastic members are affixed to the line gripper carriages and the drum means for easy removal and replacement.

In accordance with an additional feature of my invention, the line gripper carriage is locked into its pretriggering position by slightly cocking it with respect to its guideway, so that a corner thereof enters a suitable recess in said guideway, thereby eliminating the need for separate, spring-loaded carriage detenting means.

Accordingly, it is an object of my invention to provide new and useful fish hook setting devices.

Another object of my invention is to provide new and useful fish hook setting devices which are of relatively simple and economical construction.

Yet another object of my invention is to provide new and useful fish hook setting devices which may be mounted on and used in connection with conventional fishing poles.

A further object of my invention is to provide new and useful fish hook setting devices which my be integrally incorporated with new fishing poles.

A yet further object of my invention is to provide new and useful fish hook setting devices which do not require the provision of metallic power elements, such as coil springs, which are subject to corrosive attack by elements of the fishing environment.

An additional object of my invention is to provide new and useful fish hook setting devices in which the setting or embedding force is very readily adjustable over a broad range of values by means of very simple adjusting devices, which themselves are not subject to corrosion, binding of close tolerance parts, etc.

Yet another object of my invention is to provide new and useful fish hook setting devices having elongated elastic power supplying elements which are easily removed and replaced at the fishing site without tools, or with only such simple tools as are commonly found in the tackle boxes of sport fishermen.

Other objects of the present invention will in part be obvious, and will in part appear hereinafter.

My invention, accordingly, comprises the features of construction, combinations of elements, and arrangements of parts, which will be exemplified in the constructions hereinafter set forth, and the scope of my invention will be indicated in the appended claims.

For a fuller understanding of the nature and objects of my invention, reference should be had to the following detailed description, taken in connection with the accompanying drawings.

BRIEF DESCRIPTION OF THE DRAWINGS

FIG. 1 is an elevational view of a conventional fishing rod equipped with a fish hook setter embodying my invention;

FIG. 2 is a partial perspective view of a fish hook setter according to a first preferred embodiment of my invention;

FIG. 3 is a sectional view of said first preferred embodiment of my invention, taken along line 3—3 of FIG. 2;

FIG. 4 is a sectional view of said first preferred embodiment of my invention, taken along line 4—4 of FIG. 2;

FIG. 5 is an exploded view of the carriage portion of said first preferred embodiment of my invention;

FIG. 5A is a partial view in elevation and section of a fish hook setting device in accordance with a second preferred embodiment of my invention;

FIG. 6 is a partial elevational view in section of said first preferred embodiment of my invention, illustrating the operation of the fishing line gripping and releasing means thereof;

FIG. 7 is a partial sectional view in elevation of said first preferred embodiment of my invention, taken along line 7—7 of FIG. 3;

FIG. 8 is a partial sectional view in elevation of said first preferred embodiment of my invention, taken along line 8—8 of FIG. 4;

FIG. 9 is a partial sectional view in elevation of a fish hook setting device constructed in accordance with a third preferred embodiment of my invention, showing the fish line gripper carriage locked in its frontmost position;

FIG. 10 is a partial sectional view of said third preferred embodiment of my invention, showing the fish line gripper carriage immediately after release from the locked position illustrated in FIG. 9; and FIG. 11 is a partial sectional view of a fish hook setting device constructed in accordance with a fourth preferred embodiment of my invention.

DESCRIPTION OF THE PREFERRED EMBODIMENTS

Referring now to FIG. 1, there is shown a fish hook setting device or fish hook setter 10 constructed in accordance with a first preferred embodiment of my invention and mounted on a conventional fishing pole 12.

As best seen in FIG. 1, the fish hook setter 10 of the first preferred embodiment is mounted upon fishing pole 12 by means of three clamps 14, 16, 18.

As best seen by comparison of FIGS. 2, 3, and 4, fish hook setter 10 of said first preferred embodiment comprises an elongated body member 20 provided with an elongated trough or depression 22, located in the upper face of body member 20 when fish hook setter 10 is in its operative position.

As may be seen from FIGS. 3 and 4, clamps 14 and 18 are collinearly affixed to the wall of trough 22. Clamp 16 is also affixed to the wall of trough 22, and is collinear with clamps 14 and 18 and located therebetween, as seen in FIG. 1.

Clamps 14, 16, 18 are "collinear" in the sense that they are so aligned in trough 22 as to be capable of simultaneously grasping fishing pole 12 as shown in FIG. 1, whereby to firmly mount fish hook setter body 20 on fishing pole 12, sugstantially preventing body member 20 from moving along fishing pole 12 and from rotating about fishing pole 12.

While the fish hook setter mounting clamps 14, 16, and 18 of said first preferred embodiment of my invention are stiff, resilient spring clamps, it is to be understood that many other clamping arrangements, both resilient and positively locking, may be employed to affix body member 20 to its associated fishing pole without departing from the scope of my invention.

The fastening means for fastening clamps 14, 16, 18 to the wall of trough 22 are not shown, it being assumed that these clamps are cemented to integral bosses raised in the wall of trough 22. It is to be understood, however, that any expedients for attaching clamps 14, 16, and 18 to fish hook setter body 20 will occur to those having ordinary skill in the art and may be employed within the scope of my invention.

Returning to FIG. 1, it will be seen that in addition to body 20 and clamps 14, 16, and 18 the fish hook setter 10 of the first preferred embodiment of my invention also comprises gripping means 24 for gripping the fishing line 26 and carrier means 28 for carrying gripping means 24 and providing a jaw adapted to coact therewith in gripping fishing line 26.

As also shown in FIG. 1, a knob 30 projects from one side of body member 20. The structure and function of knob 30 will be described hereinafter in connection with FIGS. 2 and 3.

Referring now to FIG. 2, it will be seen that body member 20 defines a channel 32 of generally dovetail-shaped cross section. It will also be seen in FIG. 2 that channel 32 extends completely from end to end of body member 20, and that one end of channel 32 is closed by a blocking member 36.

As also seen in FIG. 2, body member 20 of said first preferred embodiment of my invention consists of two parts, viz, 20L and 20R. Parts 20L and 20R are joined, as by cementing, along a common face 20S.

In said first preferred embodiment of my invention parts 20L and 20R and blocking member 36 are fabricated from an impact resistant plastic material such as Lexan and cemented together as shown in FIG. 2 by means of suitable cementing materials well-known to those having ordinary skill in the art for use with the selected plastic material.

As best seen by comparison of FIGS. 2 and 4, channel 32 serves as a guideway for fishing line gripper carrier or carriage 28.

As best seen in FIG. 5, carriage 28 is provided with an enlarged portion 38 which is adapted to be close-fittingly, slidably received in channel 32 of body member 20. In accordance with the principles of my invention, enlarged portion 38 of carriage 28 is inserted into channel 32 after parts 20L, 20R and 36 are cemented together, and thus carriage 28 is slidably mounted in channel 32, which serves as a guideway therefor. Enlarged portion 38 is retained in channel or guideway 32 by blocking member 36 and drum member 82, described hereinbelow.

Thus, it will be seen that in accordance with the principles of my invention carriage 28 is constrained by guideway 32 to remain in a predetermined path substantially parallel to fishing pole 12, and the ends of said predetermined path are determined by blocking member 36 and drum 82 (FIG. 2).

As also seen in FIG. 2, body member 20 is provided with an integral, sloping, substantially wedge-shaped ramp member 40. In accordance with its function, which is described hereinafter, member 40 is sometimes called a "knockoff cam.".

For a more detailed description of carriage 28 and the means mounted thereupon reference should now be had to FIGS. 4 and 5.

As seen in FIG. 5, a pawl 42 is pivotably mounted on a screw 44, which itself is screwed into a suitably tapped hole in the main body of carriage 28 thereby providing a suitable pivot for pawl 42.

Carriage 28 is provided with an integral ear 46, and ear 46 is provided with a suitable recess 48 (FIG. 4). The shorter arm 50 of pawl 42 is provided with a recess (not shown) adapted to receive one end of a coil spring 52.

Thus, as will be apparent to those having ordinary skill in the art, informed by the present disclosure, when pawl 42 is pivotably mounted upon carriage 28, with one end of coil spring 52 seated in the corresponding recess in the shorter end 50 of pawl 42, and carriage 28 is slidably mounted in guideway 32 as hereinabove described, the outer end (54) of pawl 42 is resiliently biased away from body member 20.

Returning to FIG. 5, it will also be seen that movable fishing line gripping jaw 24 is pivotably mounted on the main body of carriage 28 by means of a suitable screw 56 and an associated tapped hole 60.

As also seen in FIG. 5, movable fish line gripping jaw 24 is provided with a biasing spring 62. Coil spring 62 is received at its opposite ends in two suitable recesses (not shown), one recess being provided in one arm of movable gripping jaw 24 and the other recess being provided in an ear 64 integral with or immovably affixed to the main body of carriage 28.

As also seen in FIG. 5, carriage 28 is provided with a suitable ear 66, having a serrated face 68.

Further, a corresponding serrated face 70 is provided at one extremity of movable line gripping jaw 24.

As best seen in FIG. 2, then, biasing coil spring 62 serves to resiliently urge movable jaw 24 to rotate about pivot 56, thus tending to bring serrated face 70 of movable jaw 24 into contact with serrated face 68 of ear or fixed jaw 66.

Referring now to FIG. 6, it will be seen that the fishing line 26 of conventional fishing pole 12 may be disposed between movable jaw 24 and fixed jaw 66, and more particularly between serrated face 70 and serrated face 68, whereby fishing line 26 is grippingly engaged with carriage 28 by the resilient action of coil spring 62.

Returning to FIG. 5, it will be seen that a bore 76 extends transversely through carriage 28, and that a slit or kerf 78 extends from bore 76 to and through the left-hand face of carriage 28 (as seen in FIG. 5).

Returning now to FIG. 6, it will be seen that one end of an elongated member 80 passes through slit or kerf 78 into bore 76.

In accordance with a principal feature of my invention, elongated means 80 is at least one strand of elastic material e.g., an elongated rubber band cut at one point to provide a single strand of elastic material.

In accordance with a principal feature of my invention, kerf 78 and bore 76 serve as attaching means for attaching one end of elongated elastic strand 80 to carriage 28.

In accordance with this feature of my invention, as illustrated in FIG. 6, elongated elastic strand 80 can be simply attached to carriage 28 by turning a small portion of one end thereof back upon itself, stretching the thus doubled end portion thereof, and inserting the stretched, doubled end portion into slit or kerf 78, preferably far enough so that elongated elastic member 80 lies in the plane of said common face 20S, as shown, e.g., in FIG. 4.

The width of kerf 78 will of course, be determined in accordance with the type and thickness of elastic strand material to be used, by the type of simple experimentation which is within the scope of those having ordinary skill in the art.

Thus, it will be seen that my invention provides a simple and efficient means of attaching one end of elongated elastic strand 80 to carriage 28. Other means of attaching strand 80 can be used within the scope of my invention.

Referring now to FIG. 2, and comparing the same with FIG. 3, it will be seen that knob 30 is integral with or attached to a cylindrical drum member 82 which itself is disposed in a bore 84 extending transversely through body member 20.

As best seen in FIG. 3, drum member 82 is provided with a kerf or slit 86. The width of kerf or slit 86 is substantially equal to the width of kerf or slit 78 in carriage 28, and for the same purpose.

Referring now to FIG. 7, it will be seen that drum member 82 is provided with an integral ridge 88. (See also FIG. 3.)

As also best seen in FIG. 7, bore 84 is provided with two keyways 90, 92, each of which is adapted to close-fittingly receive ridge 88 of drum member 82.

In accordance with another feature of my invention, both drum member 82 and bore 84 may be slightly tapered (narrowing to the left in FIG. 3), whereby drum member 82 may be frictionally engaged in bore 84 by simply thrusting inwardly on knob 30.

As will be evident to those having ordinary skill in the art, informed by the present disclosure, and particularly the left-hand portion of FIG. 6, one end of elongated elastic strand 80 may be attached to drum member 82 in the same manner in which the opposite end of elongated elastic member 80 is attached to carriage 28, as hereinabove described.

As will also be evident to those having ordinary skill in the art, informed by the present disclosure, drum member 82 acts as a limit stop to prevent carriage 28 from escaping from guideway 32 via its otherwise open inner end, i.e., the end thereof nearer to the handle of fishing pole 12.

It is to be particularly noted that the fact that carriage 28 is thus made demountable from guideway 32 when drum member 82 is removed from bore 84 is a particular feature of my invention, whereby elongated elastic strand 80 may be readily replaced in the field, i.e., while fishing.

Assuming first that elongated elastic strand 80 is in place in the device of the said first preferred embodiment of my invention, as shown in FIG. 6, and then must be replaced, its replacement may be easily effected in accordance with the principles of my invention by carrying out the following simple steps.

1. Withdraw drum member 82 from bore 84 sufficiently to be able to rotate drum member 82 by means of knob 30. (As seen at the left end of FIG. 6 and the lower half of FIG. 3, the inner, open end of guideway 32 is enlarged so as to make room for turns of strand 80. The outside of body 20 may also be cut back or relieved (dash line 98, FIG. 3) to accommodate knob 30 and ridge 88.)

2. Rotate drum member 82 until no part of elastic strand 80 is wrapped around drum member 82.

3. Withdraw drum member 82 completely from bore 84. (In accordance with my invention, keyways 90 and 92 (FIG. 7) are sufficiently large to accommodate elastic strand 80, thereby preventing drum 82 from being "jammed" in bore 84 by the parts of elastic strand 80 projecting from slit or kerf 86.)

4. Stretch the doubled end portion of elastic strand 80 and remove elastic strand 80 completely from slit or kerf 86 in drum member 82.

5. Set drum member 82 aside.

6. Remove carriage 28 from guideway 32 through the now-open inner end of guideway 32.

7. Stretch the doubled end portion of elastic strand 80 extending through kerf 78 in carriage 28 and remove elastic strand 80 from kerf 78 and bore 76.

8. Double over one end of the replacement elastic strand and move carriage 28 to a position closely adjacent the closed end of guideway 32.

9. Reinsert carriage 28 into the open end of guideway 32 and move carriage 28 to a position closely adjacent the closed end of guideway 32.

10. Pass the opposite end of the replacement elastic strand through the rightward end of bore 84 as shown in FIG. 3.

11. Double the free end of the replacement elastic strand, stretch the doubled portion, and insert the doubled portion deeply into the slit or kerf 86 of drum member 82, thereby attaching the free end of the replacement elastic strand to drum member 82.

12. Grasp a middle portion of the replacement elastic strand and keep the replacement elastic strand under slight tension while reinserting drum member 82 into bore 84. (In accordance with my invention, keyways 90 and 92 (FIG. 7) are made large enough to accommodate the replacement elastic strand, and prevent binding, as drum member 82 is reinserted fully into bore 84.)

Thus, it will be seen that in accordance with a principal feature of my invention an elongated elastic strand, rather than the conventional, highly-corrodible metallic spring, may be employed to propel the fishing line gripper carriage, and may be quickly and easily replaced when necessary.

Referring now to FIG. 8, it will be seen that pawl 42 is so mounted on carriage 28 as to be capable of engaging with an elongated detent notch 100 in body member 20 (see also FIG. 2).

The wall of notch 100 nearest the open end of guideway 32 slightly overhangs the bottom of the opposite wall of notch 100, so that when the beak or end 54 of pawl 42 is in notch 100 and carriage 28 is drawn toward the open inner end of guideway 32 beak 54 is locked in notch 100, but slight displacement of carriage 28 toward the outer end of guideway 32 (the closed end) is sufficient to allow pawl 42 to escape from notch 100 in response to the urging of coil spring 52.

Having thus described the parts of said first preferred embodiment of my invention, it will now be seen that that embodiment of my invention operates as follows to set the hook attached to fishing line 26 in the mouth of a fish.

After casting with fishing pole 12, the fisherman thrusts carriage 28 forwardly, i.e., away from the handle of fishing pole 12, against the urging of elastic strand 80; at the same time pressing beak 54 of pawl 42 against the adjacent surface of body member 20. When carriage 28 reaches the position shown in solid lines in FIG. 6 (and also in FIG. 8), beak 54 of pawl 42 drops into notch 100. The fisherman then continues to depress beak 54 of pawl 42, while at the same time allowing carriage 28 to respond to the urging of elastic strand 80. Thus, beak 54 of pawl 42 becomes locked in notch 100, and carriage 28 becomes locked in the position shown in solid lines in FIG. 6.

The fisherman then presses the portion of jaw 24 opposite the serrations 70, thus separating moveable jaw 24 from fixed jaw 66, and inserts fishing line 26 between these jaws.

When the fisherman then releases movable jaw 24, fishing line 26 is securely gripped between fixed jaw 66 and movable jaw 24.

When a fish takes the took on line 26 and thus pulls on line 26 carriage 28 is pulled (rightwardly in FIG. 2) against the urging of strand 80. As a result, beak 54 of pawl 42 is released from notch 10 and carriage 28 travels very rapidly toward the open inner end of guideway 32 under the urging of elastic strand 80, very rapidly pulling in a corresponding portion of fishing line 26 (about 14 inches of line 26 in the first preferred embodiment).

Even when line 26 is not completely taut from the outer eye of fishing pole 12 to the fish hook on line 26, line 26 is drawn in so rapidly by the action of elastic strand 80, and the resistance to transverse travel of fishing line 26 in the water is so much greater than the resistance to longitudinal travel of fishing line 26, that a "crack-the-whip" effect results from the sudden very rapid pulling in of said corresponding portion of fishing line 26, and thus the hook on fishing line 26 is moved sharply for a sufficient distance to embed or set it in the fish's mouth.

As best seen from the left-hand portion of FIG. 6, fishing line 26 is automatically released at the end of the rapid inward travel of carriage 28 when the unserrated end 102 of moveable jaw 24 rides onto ramp or knock-off cam 40, causing jaws 24 and 66 to be separated and thus to release fishing line 26. In this way the automatic fishing line release mechanism of my invention makes it possible for the fisherman to begin reeling in the fish immediately after the hook is set in the fish's mouth.

Referring now to FIG. 5A, there is shown the carrige 104 of a second preferred embodiment of my invention, which preferred embodiment may otherwise be substantially identical to said first preferred embodiment. In accordance with this second preferred embodiment, coil spring 62 is replaced by a bowed leaf spring 106. I have found that such a bowed leaf spring is not only cheaper and easier to assemble into the device of my invention, and to replace, but also may be fabricated from certain plastic materials or laminates which have the advantage of very high corrosion resistance as compared with metallic coil spring 62.

A second feature of my invention shown in FIG. 5A is the substitution of relatively elongated, curved gripping surfaces 108, 110 for the serrated surfaces 68, 70 of the first preferred embodiment. I have determined that by the employment of such curved, elongated, non-serrated gripping surfaces I can achieve less abrasion of the fishing line, and at the same time achieve adequate fishing line gripping strength for the purpose of my invention.

Referring now to FIGS. 9 and 10, there is shown the carriage 116 and carriage locking means of a third preferred embodiment of my invention. (It will be understood, of course, that any of the features of any of the preferred embodiments of my invention can be used together in practicing my invention, all within the scope of my invention.)

In said third preferred embodiment of my invention a guideway 118 is provided which is in all respects similar to guideway 32 of the first preferred embodiment except as hereinafter described.

Referring now to FIG. 10, it will be seen that the bottom of guideway 118 is cut back or recessed to form two ramp portions 120, 122, and an intermediate wall portion 124.

Thus, it will be seen that in order to lock carriage 116 in its forwardmost position, against the urging of its associated elastic strand 126 the fisherman need only thrust carriage 116 forward against the urging of elastic strand 126 until he can rock it into the position shown in FIG. 9, and, keeping it rocked, allow it to respond to the urging of strand 126 until its inner edge 130 becomes locked against wall portion 124 (FIG. 10).

Since the outer edge 132 of carriage 116 rests upon the adjacent, unrecessed portion 134 of the bottom of guideway 118, the pull exerted by the fish on line 138 will tend to rock carriage 116 into the position shown in FIG. 10, whereupon it is immediately released to travel inwardly along guideway 118 under the urging of elastic strand 126, resulting in the setting of the hook on line 138 in the fish's mouth.

Referring now to FIG. 11, there is shown the carriage 140 of a fourth preferred embodiment of my invention, by means of which the force which must be exerted by the fish to release the carriage can be adjusted. In this embodiment of my invention the pawl 142 is not pivotable but rather is fixed to the carriage 140. However, the bottom of the guideway 144 is recessed or relieved in the form of a ramp 146, so that carriage 140 can be rocked to the tilted position shown in FIG. 11.

The outer end 151 of pawl 142 is so located that it can be brought by rocking carriage 140 into a notch 150 similar in structure and function to notch 100 of FIG. 8. Thus, as will be seen by those having ordinary skill in the art, informed by the present disclosure, the rocking of carriage 140 by the pull of a fish on the associated fishing line will cause pawl 142 to be withdrawn from notch 150, resulting in the setting of the hook on the associated fishing line in the fish's mouth. In this embodiment, the depth of the beak 151 of pawl 142 in notch 150 can be regulated by suitable positioning of a screw 154 (FIG. 11), and thus the extent of the pull necessarily exerted by a fish in order to withdraw pawl 142 from notch 150, and to set the hook, can be regulated. As will be evident to those having ordinary skill in the art, the sloped surfaces of carriage 140 must be cut back, as compared with other embodiments so that beak 151 can clear the surface of the hook setter body during the travel of carriage 140 toward the inner end of guideway 144.

It will thus be seen that the objects set forth above, among those made apparent from the preceding description, are efficiently attained, and since certain changes may be made in the above constructions and the method carried out thereby without departing from the scope of my invention it is intended that all matter contained in the above description or shown in the accompanying drawing shall be interpreted as illustrative only, and not in a limiting sense.

It is also to be understood that the following claims are intended to cover all of the generic and specific features of my invention as herein described, and all statements of the scope of my invention which as a matter of language might be said to fall therebetween.

What I claim as new and desire to secure by Letters Patent is:

1. A fish hook setting device, comprising:
   carriage means;
   guideway means for constraining the motion of said carriage means to a predetermined path;
   mounting means for so mounting said guideway means on a fishing pole that said path is substantially parallel to said fishing pole;
   knockoff cam means located on said guideway means near the inner end of said path, which is the end thereof nearer to a handle of said fishing pole when said guideway means is mounted on said fishing pole;
   detent means located near the outer end of said path providing a fixed stop means;
   gripping means mounted on said carriage means for unidirectionally releasably gripping a fishing line carried on a winding reel and passing through eyes of said fishing pole, said gripping means comprising pivoted lever means for jamming said line against said fixed stop means, said lever means being so inclined as to permit the reeling in of said line but to prevent the paying out of said line except when deflected by said knockoff cam means;
   detent engaging means on said carriage means for engaging said detent means and being disengaged therefrom when said fishing line is pulled in a direction away from said handle;
   elastic means comprising at least one elongated strand of elastic material for propelling said carriage along said path when said detent engaging means is disengaged from said detent means;
   first attaching means for attaching said elastic means to said carriage means; and
   second attaching means for attaching said elastic means to said guideway means near said inner end of said path.

2. A fish hook setting device as claimed in claim 1 having means for adjusting tension in said at least one strand of elastic material, and the fish hook setting force is thus adjustable.

3. A fish hook setting device as claimed in claim 2, having means for adjustment of said tension by means of said second attaching means.

4. A fish hook setting device, comprising:
   carriage means;
   guideway means for constraining the motion of said carriage means to a predetermined path;
   mounting means for so mounting said guideway means on a fishing pole that said path is substantially parallel to said fishing pole;
   knockoff cam means located on said guideway means near an inner end of said path, which is the end thereof nearer to the handle of said fishing pole when said guideway means is mounted on said fishing pole;
   detent means located near the outer end of said path;
   gripping means mounted on said carriage means for releasably gripping a fishing line carried on a winding reel and passing through eyes of said fishing pole, said gripping means comprising cam engaging means for engaging said knockoff cam means and being deflected thereby, thus causing the release of said fishing line by said gripping means when said carriage means approaches the inner end of said guideway means;

detent engaging means on said carriage means for engaging said detent means and being disengaged therefrom when said fishing line is pulled in a direction away from said handle;

elastic means comprising at least one elongated strand of elastic material for propelling said carriage along said path when said detent engaging means is disengaged from said detent means;

first attaching means for attaching said elastic means to said carriage means; and second attaching means for attaching said elastic means to said guideway means near said inner end of said path;

having means for adjusting the tension of said at least one strand of elastic material being adjustable, and the fish hook setting force is thus being adjustable, said tension being adjusted by means of said second attaching means, an anchoring means forming a drum on which said at least one strand of elastic material can be wound when said anchoring means is rotated about an axis, and said anchoring means further comprising means by which said anchoring means can be maintained in a plurality of positions in each one of which the tension of the fully extended elastic material has a different corresponding value.

5. A fish hook setting device as claimed in claim 4, in which said detent engaging means is integral with said carriage means.

* * * * *